United States Patent [19]

Yamaguchi et al.

[11] Patent Number: 5,060,073
[45] Date of Patent: Oct. 22, 1991

[54] SOLID-STATE IMAGE DEVICE AND OUTPUT COMPENSATE METHOD THEREOF

[75] Inventors: Shinichi Yamaguchi; Tomoyuki Sasaki, both of Tokyo, Japan

[73] Assignee: Kabushiki Kaisha Toshiba, Kawasaki, Japan

[21] Appl. No.: 509,328

[22] Filed: Apr. 16, 1990

[30] Foreign Application Priority Data

Apr. 28, 1989 [JP] Japan ................... 1-110104

[51] Int. Cl.⁵ .................... H04N 3/14; H04N 5/335
[52] U.S. Cl. ................... 358/213.11; 358/209; 358/213.15; 358/213.24
[58] Field of Search ............ 358/213.11, 213.13, 358/213.18, 213.19, 213.22, 213.24, 213.26, 209, 228, 216, 223, 167, 177

[56] References Cited

U.S. PATENT DOCUMENTS

| | | | |
|---|---|---|---|
| 4,516,172 | 5/1985 | Miyata et al. | 358/228 |
| 4,558,366 | 12/1985 | Nagumo | 358/209 |
| 4,819,074 | 4/1989 | Suzuki | 358/209 |
| 4,825,293 | 4/1989 | Kobayashi et al. | 358/213.19 |
| 4,884,142 | 11/1989 | Suzuki | 358/213.19 |

FOREIGN PATENT DOCUMENTS

63-90973 4/1988 Japan .

Primary Examiner—Victor R. Kostak
Assistant Examiner—Tuan V. Ho
Attorney, Agent, or Firm—Foley & Lardner

[57] ABSTRACT

The solid-state image device includes a compensating device for differences in the voltage level of the data representing the first and the second field images which consist of one picture image. The compensating device outputs one field image data without change and amplifies the remaining field image data according to the differences in the voltage level of the data of the first and second field.

16 Claims, 6 Drawing Sheets

SOLID-STATE IMAGE DEVICE AND OUTPUT COMPENSATE METHOD THEREOF

BACKGROUND OF THE INVENTION

1. Field of the Invention

The present invention relates, in general, to solid-state image devices which have solid-state image sensors for producing a still image in a frame. More specifically, the invention relates to solid-state image devices which produce an iamge by interlacing two fields.

2. Description of the prior art

Generally, solid-state image devices having solid-state image sensors are widely used for their compact size and easy handling. In the image sensor, a plurality of pixels (picture element) are arranged in two-dimensions.

Accordingly, various methods are used for reading the signal charge from each pixel. Two typical processes for reading the signal charge are the Frame Transfer type and Interline Transfer type. In addition to these types, the Frame Interline Transfer type (hereinafter referred to as FIT) has been developed for use with high integration density pixels and electrical shutter functions.

In general, the FIT type image sensor includes an image section for photoelectric conversion, a storage section for storing a signal charge temporarily, a horizontal transfer section for transferring the signal charge from the storage section to the output amplifier section and an output amplifier section. In the image section, a plurality of photodiodes are arranged in two-dimensions. Vertical transfer CCDs (Charge Coupled Device) are disposed between lines of photodiodes. Consequently, the photodiodes behave as linear image sensors. The linear image sensors, present in the the same number as there are horizontal pixels, are arranged in parallel. The top surface of the vertical transfer CCD is shielded optically. Image light is incident (falls) only on the photodiodes and is photoelectrically converted. With the photoelectric conversion for a prescribed time, electro charges which are stored in the photodiodes are transferred in parallel to the corresponding vertical transfer CCD at one time. This operation is performed due to the closeness of the pixels and vertical transfer CCDs. The storage section is capable of storing all of the signal charges that constitute one field image. Further, the storage section is well shielded.

After the transfer of the signal charges from each pixel to the vertical transfer CCD has been performed, the vertical transfer CCDs transfer the signal charges to the storage section by using a frame transfer technique. The vertical transfer CCD, which performed the frame transfer, is also used as a part of a drain for undesired charge.

Accordingly, FIT is capable of controlling the amount of time that each pixel stores a signal charge. Line shift occurs within each horizontal blanking period, and signal charges, which consist of one horizontal line of the picture image, are transferred from the storage section to the horizontal transfer section successively. Signal charges in the horizontal transfer section are transferred to the output section.

As an example, this type of solid-state image device is described in Japanese Patent Disclosure (Kokai) No. 63-90973. The conventional technique discloses that undesirable charge is swept out through the vertical transfer CCDs in a conventional manner. Specifically, the undesirable charge is swept out through the vertical transfer CCDs and the storage section in each frame period but not in each field period.

In the solid-state image device described above, however, the vertical transfer CCDs are disposed adjacent to the linear image sensors. Thus, a slight amount of light gets into the vertical transfer CCDs. Thus, a charge corresponding to the quantity of light incident is generated in the vertical transfer CCDs due to the smear phenomena. As a result, a difference in picture signal levels is caused by comparison of one field signal to the next.

SUMMARY OF THE INVENTION

Accordingly, it is an object of the present invention to provide an improved solid-state image device wherein the difference in each image field signal level can be compensated.

It is a further object of the present invention to provide a solid-state image device which is capable of preventing the generation of flicker on the image.

In accordance with the present invention, the foregoing objects are achieved by providing, a solid-state image device including a solid-state image sensor for picking up a picture image comprised of a first field image and a second field image, a control device for controlling the output of data of a certain voltage level from the output section of the solid-state image sensor. The data represents the first field image and the second field image. The solid-state image device further includes a compensating device for differences in the voltage level of the data representing the first and the second field images. The compensating device outputs one field image data without change and amplifies the remaining field image data according to the differences in the voltage level of the data of the first and second field.

BRIEF DESCRIPTION OF THE DRAWINGS

These and other objects and advantages of this invention will become more apparent from the following detailed description of the presently preferred embodiment of the invention, taken in conjunction with the accompanying drawings of which.

DETAILED DESCRIPTION OF THE PREFERRED EMBODIMENT

The preferred embodiment of the present invention will now be described in more detail with reference to the accompanying drawings.

Figure 1:
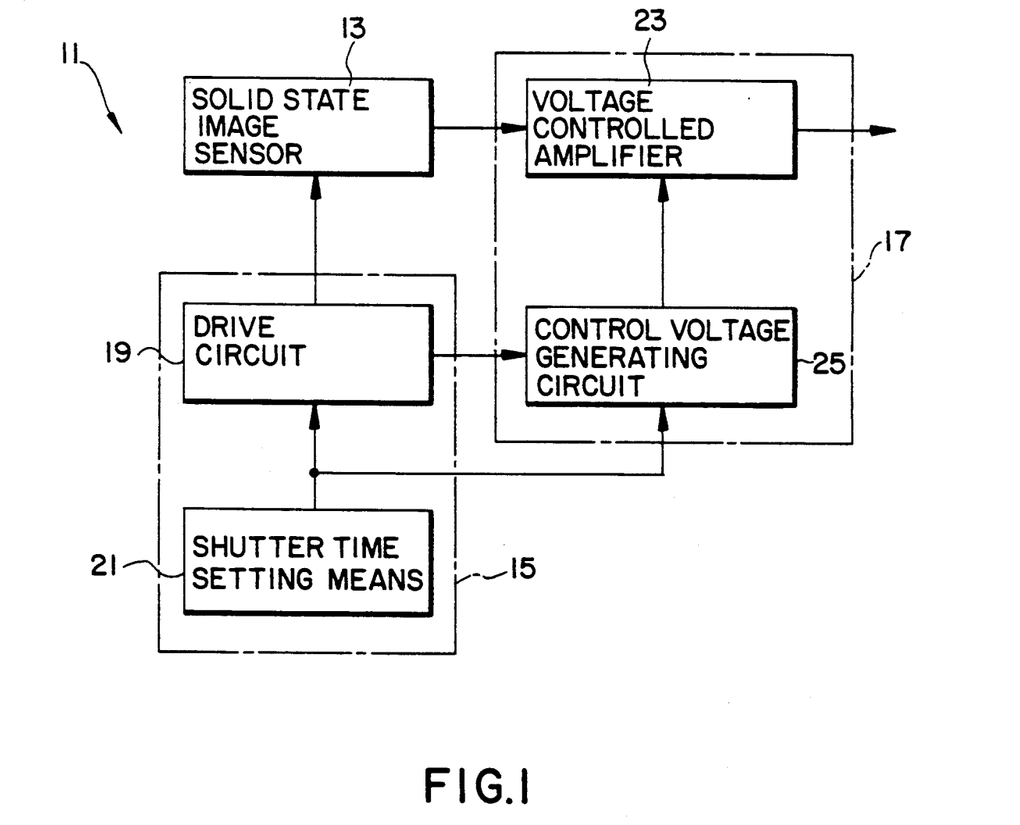
FIG. 1 is a basic block diagram of the solid-state image device according to the present invention.

In an exemplary embodiment of the present invention, as illustrated in FIG. 1, there is provided a solid-state image device, represented generally by the numeral 11. A solid-state image device 11 includes a solid-state image sensor 13, a control unit 15 and a compensate unit 17. The control unit 15 includes a drive circuit 19 and a shutter time setting means 21. The compensate unit 17 includes a voltage controlled amplifier 23 and a control voltage generating circuit 25. The solid-state image sensor 13 is connected to the drive circuit 19 in the control unit 15 and receives different kinds of pulses (details are described later) from the drive circuit 19. Further, the solid-state image sensor 13 outputs voltage $V_{IN}$ which represents the picture signal. The shutter time setting means 21 is connected to the drive circuit 19 and the control voltage generating circuit 25 in the compensate unit 17.

Thus, the shutter time information which is set in the shutter time setting means 21 is supplied to the drive circuit 19 and the control voltage generating circuit 25. This shutter time information is defined as the electrical control time for integrating the signal charge in one field period. The control voltage generating circuit 25 is also connected to the drive circuit 19 in the control unit 15. This control voltage generating circuit 25 receives a field index pulse which specifies first field information or second field information, which are then combined to produce a one frame picture. The voltage controlled amplifier 23 is connected to the output side of the solid-state image sensor 13 and receives as an input an image signal which is produced by the solid-state image sensor 13. The voltage controlled amplifier 23 is also connected to the output side of the control voltage generating circuit 25. The voltage controlled amplifier 23 receives control voltage $V_{CONT}$, which specifies the input-output characteristic of the voltage controlled amplifier 23, from the control voltage generating circuit 25. The amplification factor of the voltage controlled amplifier 23 is decided in response to the control voltage $V_{CONT}$. Accordingly, the voltage controlled amplifier 23 amplifies the input from the solid-state image sensors 13 by a certain amount according to control voltage $V_{CONT}$ from the control voltage generating circuit 25.

Figure 2:
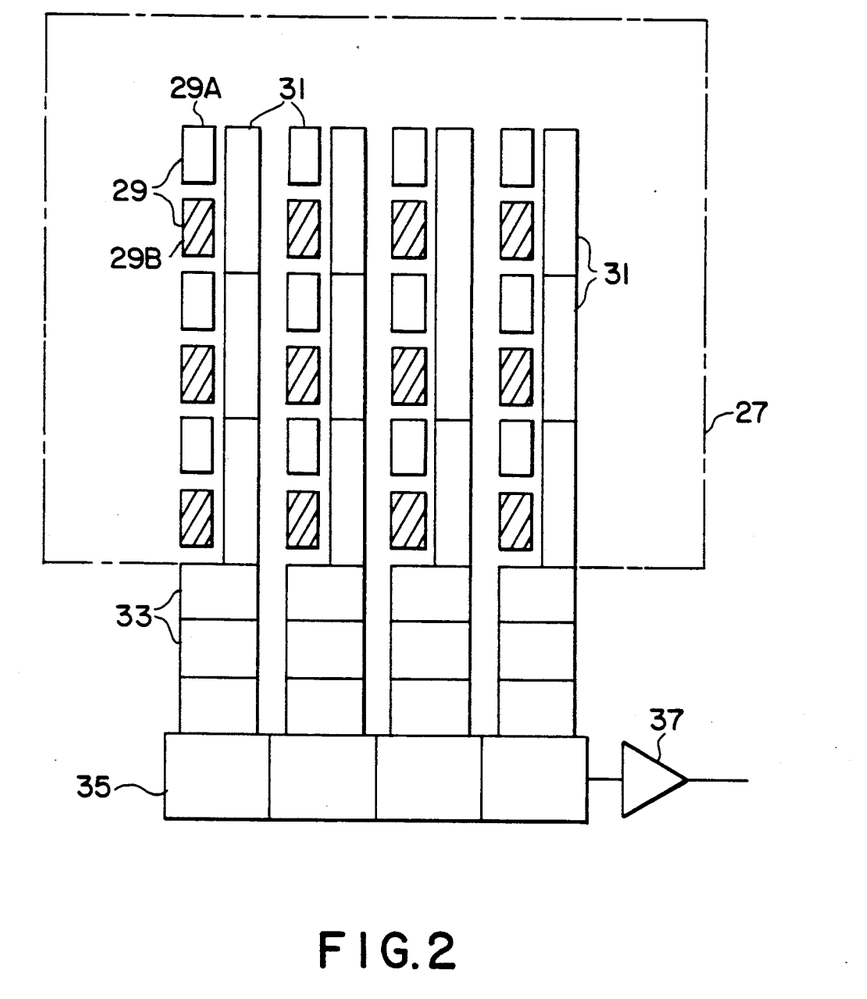
FIG. 2 is a detailed view of the solid-state image sensor.

Referring now to FIG. 2, there is provided a more detailed view of the solid-state image sensor 13 of the preferred embodiment of the present invention. The sensor 13 is what is called the FIT type solid-state image sensor. The solid-state image sensor 13 includes image section 27 for photoelectric conversion, storage section 33 for storing signal charge, horizontal transfer section 35 for transferring signal charge of storage section 33 to output amplifier section 37 and output amplifier section 37. The image section 27 is of the type which includes photoelectric conversion element 29 and vertical transfer part 31. One suitable component for the photoelectric conversion element 29 is a photodiode. The number of photoelectric conversion elements 29 present correspond to the number of pixels present in one frame of the picture. FIG. 2 shows a typical example which is a case of twenty four (24) pixels. The photoelectric conversion elements 29 are arranged in two-dimensions, as shown FIG. 2. The element 29A which is illustrated as a blank box in FIG. 2 corresponds to a pixel on the first field line. The element 29B which is illustrated as a box with oblique lines in FIG. 2 corresponds to a pixel on the second field line. The vertical transfer parts 31 are disposed between photoelectric conversion elements 29. Each vertical transfer part 31 corresponds to a pair of photoelectric conversion elements 29, which consist of pixel 29A and pixel 29B. The vertical transfer parts 31, of which there are half the number of the pixels in the vertical direction are arranged in series, adjacent to the photoelectric conversion elements 29. One suitable component for a vertical transfer part 31 is a vertical transfer CCD. The top surface of the vertical transfer part 31 is optically shielded. The output side of the vertical transfer part 31 is connected to the storage section 33. The storage section 33 should be prepared to have the same capacity as the vertical transfer parts 31. Thus, the number of the storage sections 33 is equal to the number of vertical transfer parts 31. One suitable component for the storage section 33 is a vertical CCD. The output side of each storage section 33 is connected to the horizontal transfer section 35. One suitable component for the horizontal transfer section 35 is a charge signal readout CCD. The output side of the horizontal transfer section 35 is connected to the output amplifier section 37. Preferably, in the output amplifier section 37, the signal charge which is transferred from the horizontal transfer section 35 is amplified.

Figure 3:
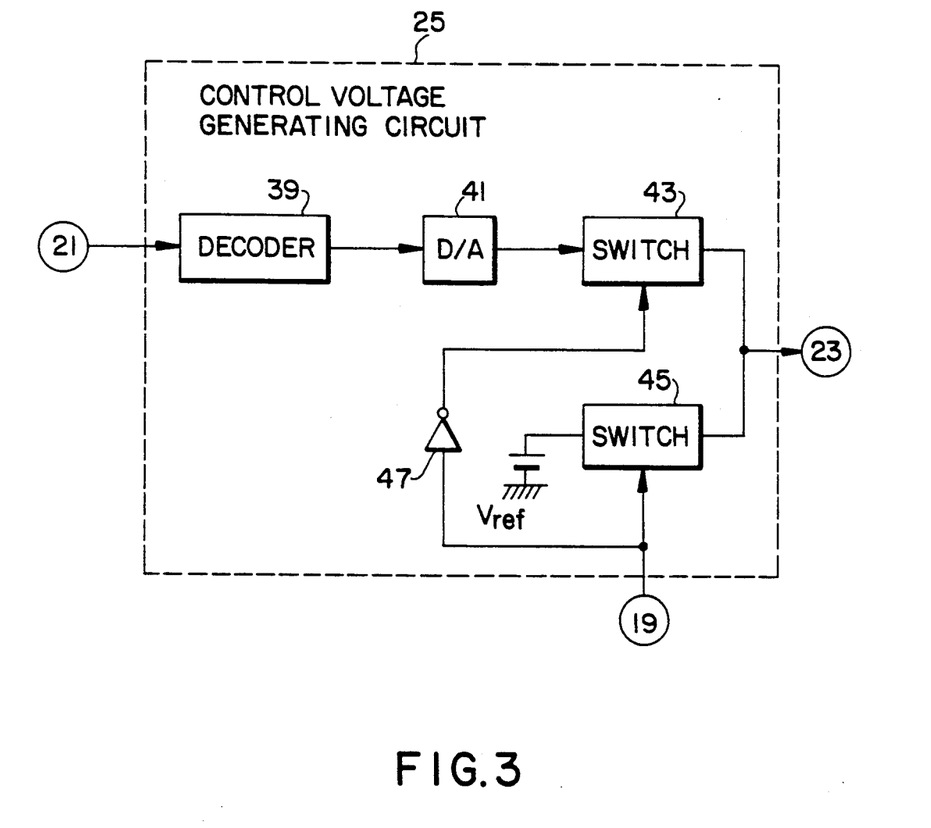
FIG. 3 is a block diagram of the control voltage generating circuit shown in FIG. 1.

In FIG. 3, a control voltage generating circuit 25 includes a decoder 39, a D/A converter 41, switches 43 and 45 and inverter 47. One side of the decoder 39 is connected to the shutter time setting means 21. Thus, the shutter time information is decoded at the decoder 39. The other side of the decoder 39 is connected to the D/A converter 41. Preferably, the D/A converter 41 outputs a voltage which is proportional to the inverse value of the shutter time. The output from the D/A converter 41 is supplied to the switch 43. The other side of the switch 43 is connected to the drive circuit 19 through the inverter 47. The switch 43 is also connected to the drive circuti 19. Further, the switch 45 is connected to a reference voltage.

During the signal output period of the second field image, the control voltage $V_{CONT}$, which is in proportion to the shutter time, is output from the control voltage generating circuit 25. Further, during the signal output period of the first field image, the control voltage $V_{CONT}$ is not produced in the control voltage generating circuit 25.

Figure 4:
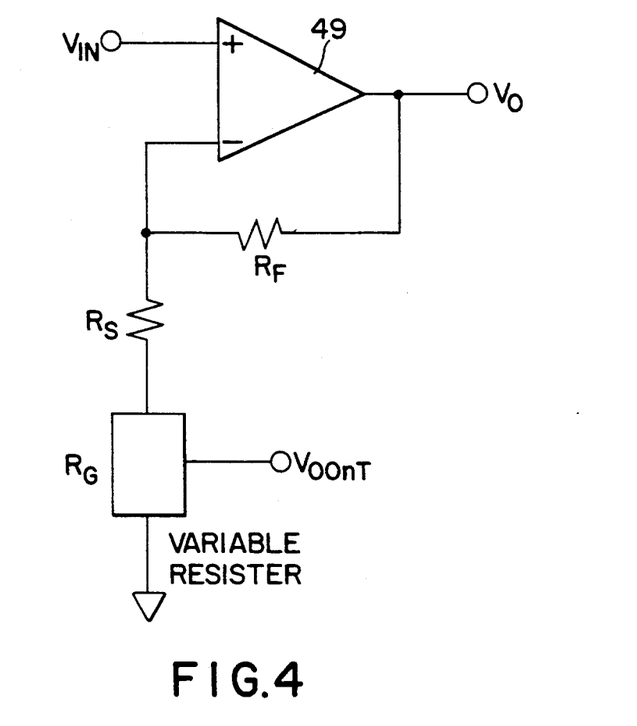
FIG. 4 is a circuit diagram of the voltage controlled amplifier shown in FIG. 1.

Referring now to FIG. 4, there is provided a circuit diagram of the preferred embodiment of the voltage controlled amplifier 23. The voltage controlled amplifier 23 includes operational amplifier circuit 49, feedback resister $R_F$, variable resister $R_G$ and reference resister $R_S$. The variable resister RG is used as a gain control element as shown in FIG. 4. Thus, the frequency response of the amplifier 23 depends on feedback resister $R_F$ practically. As a result, Vo is obtained by following formula.

$$Vo = R_F/(R_S + R_G) \times V_{IN}$$

Figure 5:
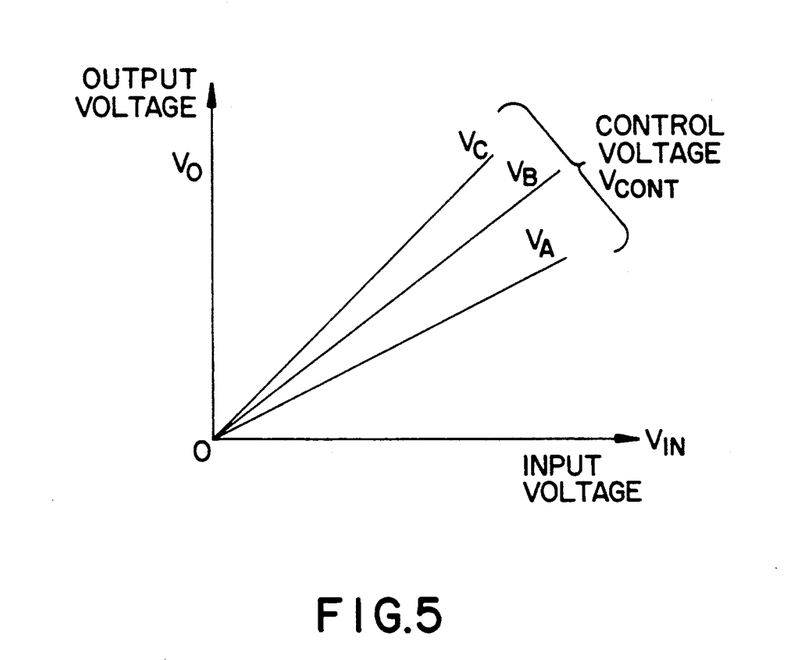
FIG. 5 is a graph illustrating the input-output characteristic of the voltage controlled amplifier shown in FIG. 4.

The output of solid-state image sensor 13 is supplied to the plus terminal of the operational amplifier 49. Thus, the output voltage Vo of the voltage controlled amplifier 23 is decided by the input voltage $V_{IN}$ and the control voltage $V_{CONT}$ as shown in FIG. 5.

Figure 6:
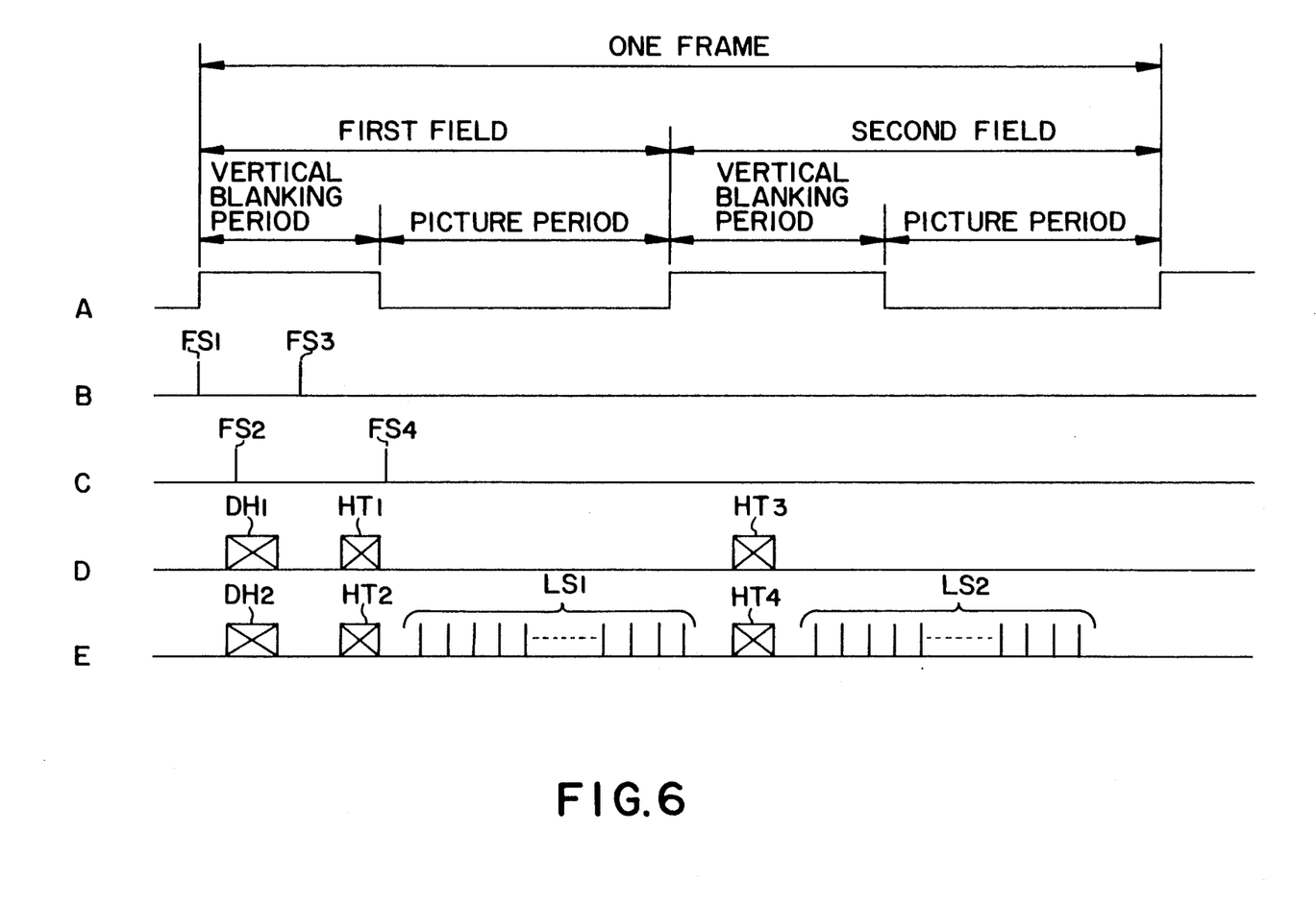
FIGS. 6A through 6E are timing charts explaining the operation of the solid-state image sensor.

The operation of the above-described solid-state image device 11 will now be described. In the solid-state image device, it is possible to set an optional image pickup period by using a variable electric shutter. The shutter time starts after feeding a clear pulse (initialize pulse) which initiates transferring of undesirable charge to the vertical transfer CCDs. The shutter time is defined as the period until a field shift pulse is sent to initiate transferring of the signal charge to the vertical transfer CCDs. Firstly, an appropriate sweep out operation of undesirable charge is carried out in the following manner. In Fig. 6A, one frame period consists of first field period and second field period. Each field period consists of a vertical blanking period and a picture period. The drive circuit 19 generates a field shift pulse FS1. As shown FIG. 6B, the field shift pulse FS1 is impressed to the photoelectric conversion elements 29A, 29A . . . As mentioned before, the photoelectric conversion elements 29A, 29A . . . correspond to the first field. The field shift pulse FS1 is impressed shortly before a vertical blanking period starts. Thus, after field shift pulse FS1 is generated, undesirable charges which are stored in photoelectric conversion elements 29A, 29A . . . are transferred to the vertical transfer part 31. In a vertical blanking period of the first field period, the drive circuit 19 generates the field shift pulse FS2. The field shift pulse FS2 is impressed to the photoelectric conversion elements 29B, 29B . . . , as shown FIG. 6C. The elements 29B, 29B . . . correspond to the second field. Then, undesirable charge which is stored in photoelectric conversion elements 29B, 29B . . . is transferred to the vertical transfer part 31. As a result, a mixture of the undesirable charge of the elements 29A, 29A . . . and the elements 29B, 29B . . . is stored in the vertical transfer part 31 temporally. After that, in a vertical blanking period of the same first field period, the drive circuit 19 generates the charge sweep out pulses DH1, DH2. The pulse DH1 is impressed to the vertical transfer part 31 with a timing as shown FIG. 6D. The pulse DH2 is also impressed to the storage section 33 using a timing as shown FIG. 6E. Therefore, the undesirable charge is swept out through the vertical transfer part 31 and the storage section 33 at high speed.

Next, the readout of signal charge will be explained. After the sweep out of undesirable charge in the vertical blanking period of the first field period, the drive circuit 19 generates the field shift pulse FS3. The field shift pulse FS3 is impressed on the photoelectric conversion elements 29A, 29A . . . as shown FIG. 6B. Here, the shutter time is defined as the period of time which elapses between the moment a field shift pulse FS1 is generated and the moment a field shift pulse FS3 is generated. When FS3 is generated, signal charges which are stored in photoelectric conversion elements 29A, 29A . . . within the shutter time are transferred to the vertical transfer parts 31, 31 . . . In the same vertical blanking period of the first field period, the drive circuit 19 generates the high speed transfer pulses HT1, HT2. The high speed transfer pulse HT1 is impressed on the vertical transfer part 31 as shown FIG. 6D. At the same timing, the high speed transfer pulse HT2 is impressed on the storage section 33 as shown FIG. 6E. Thus, the signal charges in the vertical transfer parts 31 which have been transferred from the photoelectric conversion elements 29A, 29 . . . are transferred to the storage section 33. In the same vertical blanking period of the first field period, the drive circuit 19 generates the field shift pulse FS4. The field shift pulse FS4 is impressed on the photoelectric conversion elements 29B, 29B . . . as shown FIG. 6C. Similarly as mentioned-above, shutter time is defined as that period of time that elapses between the moment a field shift pulse FS2 is generated and the moment a field shift pulse FS4 is generated. Signal charges which are stored in photoelectric conversion elements 29B, 29B . . . within the shutter time are transferred to the vertical transfer parts 31, 31 . . . As a result, signal charges which correspond to the first field image exist in the storage section 33, 33 . . . and signal charges which correspond to the second field image exist in the vertical transfer part 31, 31 . . . In each horizontal blanking period which is within the image period of the same first field period, the drive circuit 19 generates a line shift pulse LS1. The line shift pulse LS1 is impressed on the storage section 33 as shown FIG. 6E. Thus, the signal charge which corresponds to the first field image is transferred to the horizontal transfer section 35 by ones image information. The signal charge is then output through the output amplifier section 37. Thus, the signal which is in the first field period is produced.

In the vertical blanking period of the second field period, the drive circuit 19 generates the high speed transfer pulses HT3, HT4. The high speed transfer pulse HT3 is impressed on the vertical transfer part 31 at the timing as shown FIG. 6D. At the same timing, the high speed transfer pulse HT4 is impressed on the storage section 33 as shown FIG. 6E. The signal charges which are on standby in the vertical transfer part 31 are transferred to the storage section 33 at high speed. In each horizontal blanking period which is within the image period of the same second field period, the drive circuit 19 generates a line shift pulse LS2. The line shift pulse LS2 is impressed on the storage section 33 as shown FIG. 6E. Thus, the signal charge which corresponds to the second field image is transferred to the horizontal transfer section 35 by ones image information. The signal charge is output through the output amplifier section 37. Thus, the signal of the second field period is produced.

The relationship of each of the above discussed pulses is as follows. The field shift pulses FS1 and FS2 must be generated before the charge sweep out pulses DH1 and DH2 are generated. The shutter period, which is indicated as FS2-FS4, has to include at least the charge sweep out pulse DH1 and the high speed thransfer pulse HT1. The high speed transfer pulses HT1 and HT2 haves to exist in the interval between the field shift pulses FS3 and FS4.

As mentioned-above, the signal charge corresponding to the first field image are immediately transferred to the storage section 33 through the vertical transfer part 31. Thus, the signal charge which corresponds to the first field image is not affected by the smear phenomenon. However, the signal charge corresponding to the second field image is held on standby in the vertical transfer part 31. Thus, the signal charge which corresponds to the second field image is strongly affected by smear phenomenon. Because of the smear phenomenon, a certain amount of charge arises.

Figure 7:
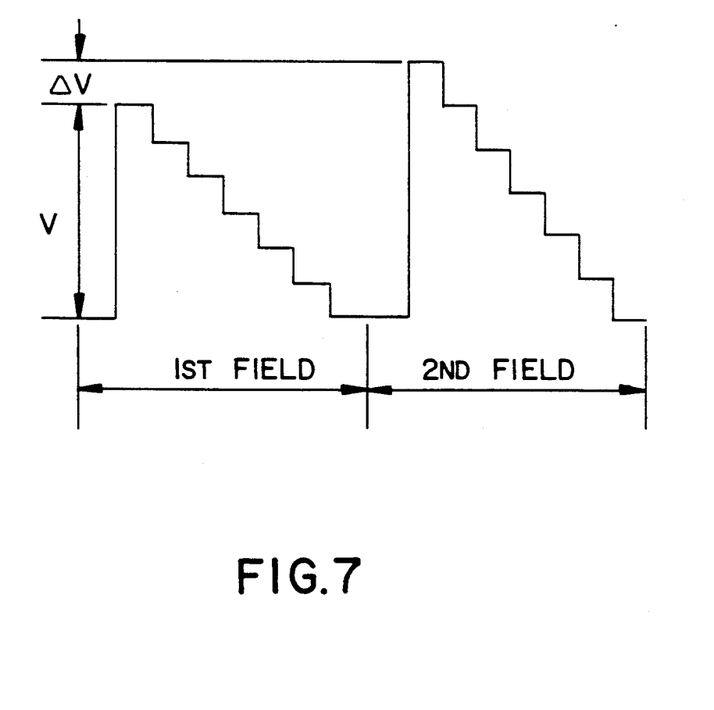
FIG. 7 is a wave form explaining the difference of picture signal levels between the first field and second field.

Accordingly, when the signal level of the first field image is V, the signal level of the second field image is increased by $\Delta V$, as shown FIG. 7. Further, the voltage level $\Delta V$ which is added to the signal enlarges in proportion to the shutter period. The signals of the first field image and the second field image, which are output from the solid-state image sensor 13, are amplified at the voltage controlled amplifier 23 respectively. When the signal of the first field image is outputted from the solid-state image sensor 13, control voltage $V_{CONT}$ is not produced in the control voltage generating circuit 25. Thus, the gain of the voltage controlled amplifier 23 is 1 (one). As a result, the voltage controlled amplifier 23 outputs the signal of the first field image at its existing level. When the signal of the second field image is output from the solid-state image sensor 13, the control voltage $V_{CONT}$ is produced in the control voltage generating circuit 25 so that an appropriate gain is provided by the voltage controlled amplifier 23. Thus, the signals of the second field image are amplified by a gain which corresponds to the control voltage $V_{CONT}$ in the voltage controlled amplifier 23.

Accordingly, the signal level of the second field image is compensated so that it is equal to the signal level of the first field image.

However, another embodiment of this invention would result in the signal level of the first field image being compensated so that it is equal to the signal level of the second field image.

Numerous other modifications and variations of the present invention are possible in light of the above teachings. It is therefore to be understood that, within the scope of the appended claims, the present invention can be practiced in a manner other than as specifically described herein.

What is claimed is:

1. A solid-state image device comprising:
   a solid-state image sensor having a plurality of photoelectric conversion elements and a transfer section, a storage section, and an output section, wherein the solid-state image sensor picks up a picture image comprised of the first field image and a second field image;
   a control means for controlling the output of data of a certain voltage level from the output section of the solid-state image sensor, said data representing the first field image and the second field image;
   a means for compensating for differeces in the voltage level of the data representing the first and the second field images, wherein the compensating means outputs one field image data without change and amplifies the remaining field image data by an amount based on a shutter time of said photoelectric conversion elements to compensate for the differences in the voltage level of the data of the first and second field.

2. A device according to claim 1, wherein the photoelectric conversion element is a photodiode.

3. A device according to claim 1, wherein the transfer section comprise vertical transfer CCDs.

4. A solid-state image device comprising:
   a solid-state image sensor having a plurality of photoelectric conversion elements and a transfer section, a storage section, and an output section, wherein the solid-state image sensor picks up a picture image comprised of a first field image and a second filed image;
   a control means for controlling the output of data of a certain voltage level from the output section of the solid-state image sensor, said data representing the first field image and the second field image;
   a means for compensating for differences in the voltage level of the data representing the first and the second field images, wherein the compensating means outputs one field image data without change and amplifies the remaining field image data according to the differences in the voltage level of the data of the first and second field;
   wherein the control means includes a drive means and a shutter time setting means, wherein the drive means operates to generate a plurality of pulses which are supplied to the solid-state image sensor and the shutter time setting means operates to select a shutter time for the photoelectric conversion elements of the solid-state image sensor.

5. A device according to claim 4, wherein the compensating means includes a control voltage generating means and a voltage controlled amplifier, the control voltage generating means operating to generate a control voltage according to the length of the shutter time and the voltage controlled amplifier operating to amplify input data an amplification factor depending on the control voltage.

6. A device according to claim 5 further including means for decoding the shutter time.

7. A device according to claim 5, wherein the voltage controlled amplifier has as its input the first field image data.

8. A device according to claim 5, wherein the voltage controlled amplifier has as its input the second field image data.

9. A device according to claim 4, wherein the drive means generates a first pulse, a second pulse, a third pulse, a fourth pulse, a fifth pulse and a sixth pulse, respectively, wherein the first pulse is an initialize pulse supplied to the photoelectric conversion elements, the second pulse is a sweep out pulse used to initiate removal of undesirable charges which will not be used for image construction.

the third pulse is a transfer pulse used to initiate transfer of the charge in the photoelectric conversion elements to the transfer section of the solid-state image sensor.

the fourth pulse is a high speed transfer pulse used to initiate transfer of the charge in the transfer section to the storage section, the fifth pulse is an output pulse used to initiate output of the charge corresponding to one line of the field image, and the sixth pulse is supplied to the compensating means as an index pulse of each field image.

10. A device according to claim 9, wherein the first pulse is generated before the second pulse is generated.

11. A device according to claim 9, wherein the shutter time includes at least the second pulse width and the fourth pulse width.

12. A device according to claim 9 wherein the shutter time is substantially defined as the interval between the first pulse and the third pulse.

13. A device according to claim 9, wherein the fourth pulse is generated between the third pulse, which is supplied to the photoelectric conversion elements corresponding to the first field image, and the third pluse, which is supplied to the photoelectric conversion elements corresponding to the second field image.

14. A device according to claim 9, wherein the fourth pulse is generated within a vertical blanking period of the second field period.

15. A device according to claim 9 further including means for generating a control voltage according to the shutter time when either field image is output from the shutter time when either field image is output from the sensor and means for amplifing an input image by an amplification factor depending on the control voltage.

16. A method for compensating the output of a solid-state imaging device having a solid-state image sensor which picks up a picture image consisting of a first field image and a second field image, and wherein the image sensor receives incident light during a period defined as a shutter time, including the steps of:

distinguishing which field image is output from the solid-state image sensor;

selecting the amplification factor of the field image in response to the shuttter time; and compensating the difference in the level of the field images by use of the amplification factor.

* * * * *